United States Patent [19]

Mizumoto et al.

[11] Patent Number: 4,654,569
[45] Date of Patent: Mar. 31, 1987

[54] CONTROL CIRCUIT FOR TRANSFER DEVICE

[75] Inventors: Masakatsu Mizumoto, Kanazawa; Yasuhiro Umano, Ishikawa, both of Japan

[73] Assignee: Kabushiki Kaisha Komatsu Seisakusho, Tokyo, Japan

[21] Appl. No.: 625,671

[22] Filed: Jun. 28, 1984

[30] Foreign Application Priority Data

Jul. 8, 1983 [JP] Japan .................. 58-124242

[51] Int. Cl.⁴ ........................ G05B 19/42
[52] U.S. Cl. .................. 318/568; 318/571; 318/85; 307/119; 414/749; 414/750; 100/45
[58] Field of Search ........... 307/119; 318/39, 41, 318/40, 38, 34, 35, 62, 571, 569, 567, 575, 85, 603, 625, 568, 569, 574; 100/43, 45, 48, 49, 41; 414/749, 750, 751, 752; 364/476, 474

[56] References Cited

U.S. PATENT DOCUMENTS

| | | | |
|---|---|---|---|
| 3,456,814 | 7/1969 | Bautz | 414/750 X |
| 3,479,574 | 11/1969 | Kosem | 318/569 X |
| 3,668,498 | 6/1972 | Austin | 318/568 |
| 3,757,961 | 9/1973 | Jacobs | 414/750 X |
| 3,907,098 | 9/1975 | Babbitt | 414/751 X |
| 4,314,185 | 2/1982 | Schneider et al. | 318/85 |
| 4,349,310 | 9/1982 | Schneider et al. | 414/749 |
| 4,352,627 | 10/1982 | Schneider et al. | 414/752 |
| 4,359,153 | 11/1982 | Gerben et al. | 414/750 X |
| 4,378,592 | 3/1983 | Heiberger et al. | 364/476 |
| 4,379,987 | 4/1983 | Kohzai et al. | 318/571 X |
| 4,386,306 | 5/1983 | Nishimura et al. | 318/571 |
| 4,387,632 | 6/1983 | Heiberger | 100/45 |
| 4,485,338 | 11/1984 | Matsuura et al. | 318/569 |

FOREIGN PATENT DOCUMENTS 33042 2/1984 Japan .

Primary Examiner—William M. Shoop, Jr.
Assistant Examiner—Shik Luen Paul Ip
Attorney, Agent, or Firm—Spensley Horn Jubas & Lubitz

[57] ABSTRACT

In a control circuit for a transfer device including feed bars movable along two or three axes and servo-actuators respectively provided for driving the feed bars in stroke-forming movements along the axes, there are provided a stroke signal generator for generating a stroke defining signal separately from press movement and press control device for controlling the operation of a press. Based on the output signal from the stroke signal generator, the press control delivers press starting and stopping instructions at appropriate instants not interfere with the movements of the feed bars for initiating press operations of an intermittent nature.

15 Claims, 7 Drawing Figures

CONTROL CIRCUIT FOR TRANSFER DEVICE

BACKGROUND OF THE INVENTION

1. Field of the Invention

This invention relates to a control circuit for controlling a transfer device that transfers materials or works to be pressed to and from the predetermined positions in a press mold.

2. Description of the Prior Art

Transfer devices of constructions operable in 2-dimensional and 3-dimensional manners have been widely known. The former type shifts (advances and retracts) a pair of feed bars 1 in the direction of X-axis for a distance corresponding to a stroke as shown in FIG. 1, and also in the direction of Y-axis for a predetermined distance of a stroke for clamping and unclamping the materials or works. The latter type, on the other hand, besides of the above described operations, shifts (up and down) the feed bars 1 in the direction of Z-axis as shown in FIG. 2.

Heretofore the above described operations of the transfer device have been ordinarily carried out utilizing a power supplied from a crank shaft of, for instance, a press through a cam mechanism. However, recently another arrangement in which a press-stroke angle (crank angle of the shaft) is detected by an encoder, and the above described movements of the feed bars are caused by separately provided servo-actuators in response to the detected press-stroke angle, has been also proposed.

In the afore-mentioned 2-dimensional transfer device, the material feeding operation and the clamping and releasing operation are ordinarily carried out at a timing as shown in FIG. 3. During such operations, a time interval corresponding to 120° crank angle (⅓ of the press stroke) measured from the completion of opening (at 120° crank angle) of fingers 2 (see FIGS. 1 and 2) to start-closing instant (at 240° crank angle) of the same is utilized for the effective pressing operation of the press. Accordingly, in the transfer device where the work is supplied in synchronism with the movement of the press, the depth formed by press (drawing) in the products is less than ⅓ of the press stroke. If it is desired to utilize ½ of the press stroke for the press operation, a time interval corresponding to such an amount of press stroke angle must be assigned between the opening completion instant and the start-closing instant of the fingers 2 during substantially returning stroke of the feed bars 1. This inevitably delays the returning stroke of the feed bars 1, and hence reduces the press speed.

SUMMARY OF THE INVENTION

An object of the present invention is to provide a control circuit for a transfer device wherein the above described difficulties in the control of the conventional transfer devices can be substantially eliminated.

Another object of the invention is to provide a control circuit for a transfer device wherein degrees of freedom during the cooperation between the transfer device and press can be substantially improved.

Still another object of the invention is to provide a control circuit for a transfer device wherein the transfer device is operated in synchronism with or independent from the operation of the press, so that not only the freedom in the cooperation but also the operation range of the transfer device can be improved.

According to the present invention, there is provided a control circuit for a transfer device, wherein the transfer device includes feed bars movable in the directions of either one of two and three axes, and in response to a signal defining one stroke movement along each axis, each of servo-actuators provided respectively for the axial movements drives the feed bars in a stroke forming movement along the axis, characterized in that the circuit comprises means for generating the signal defining the one-stroke movement separately from the output of a sensor detecting a press stroke angle, and based on the output of the signal generating means, the transfer device is operated independently from the press operation, while the press is operated based on the output of the signal generating means, to start and stop at an appropriate timing not interfere with at least the movements of the feed bars for realizing an operation intermittent between every press strokes.

According to another embodiment of the invention, the control circuit further comprises a transfer switch which selects either one of the output signal from the sensor sensing the press stroke angle and the output signal from the signal generating means, and by the operation of the switch, the transfer device is operated in synchronism with the press stroke or not in synchronism with the press stroke.

DESCRIPTION OF THE PREFERRED EMBODIMENTS

Figure 1:
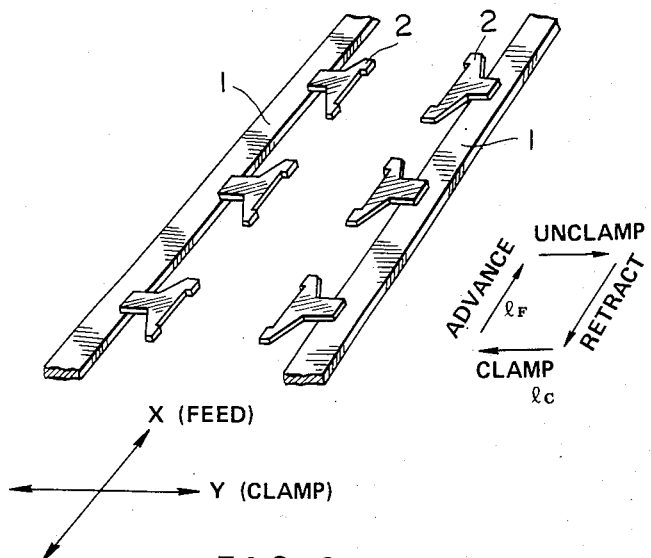
FIGS. 1 and 2 are perspective views for explaining operations of feed bars included in a transfer device operable in two and three dimensions, respectively.
Figure 2:
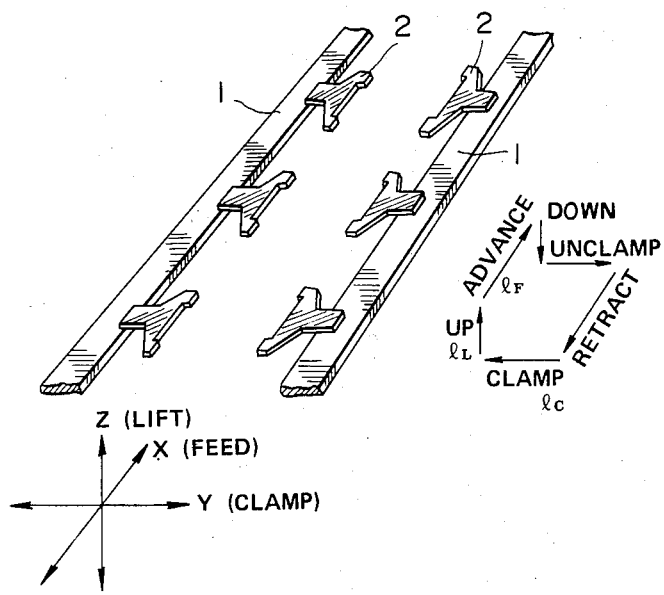
Figure 3:
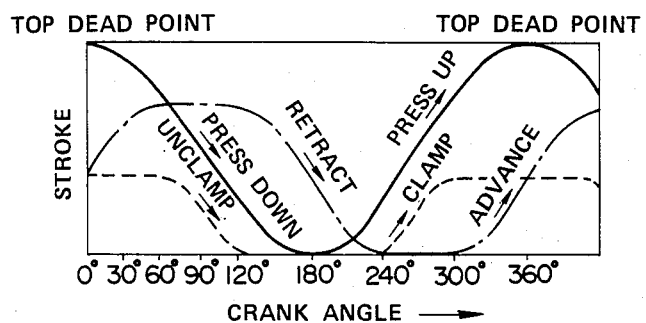
FIG. 3 is a diagram showing timing between operations of feed bars and the press.

The invention will now be described in detail with reference to the accompanying drawings. It should be noted that the feed bars of a transfer device according to the invention are movable in the directions of X axis and Y axis as shown in FIG. 1 or in the directions of X, Y and Z axes as shown in FIG. 2, and the movements along these axes of the feed bars are caused by servomotors provided separately for these axes.

Figure 4:
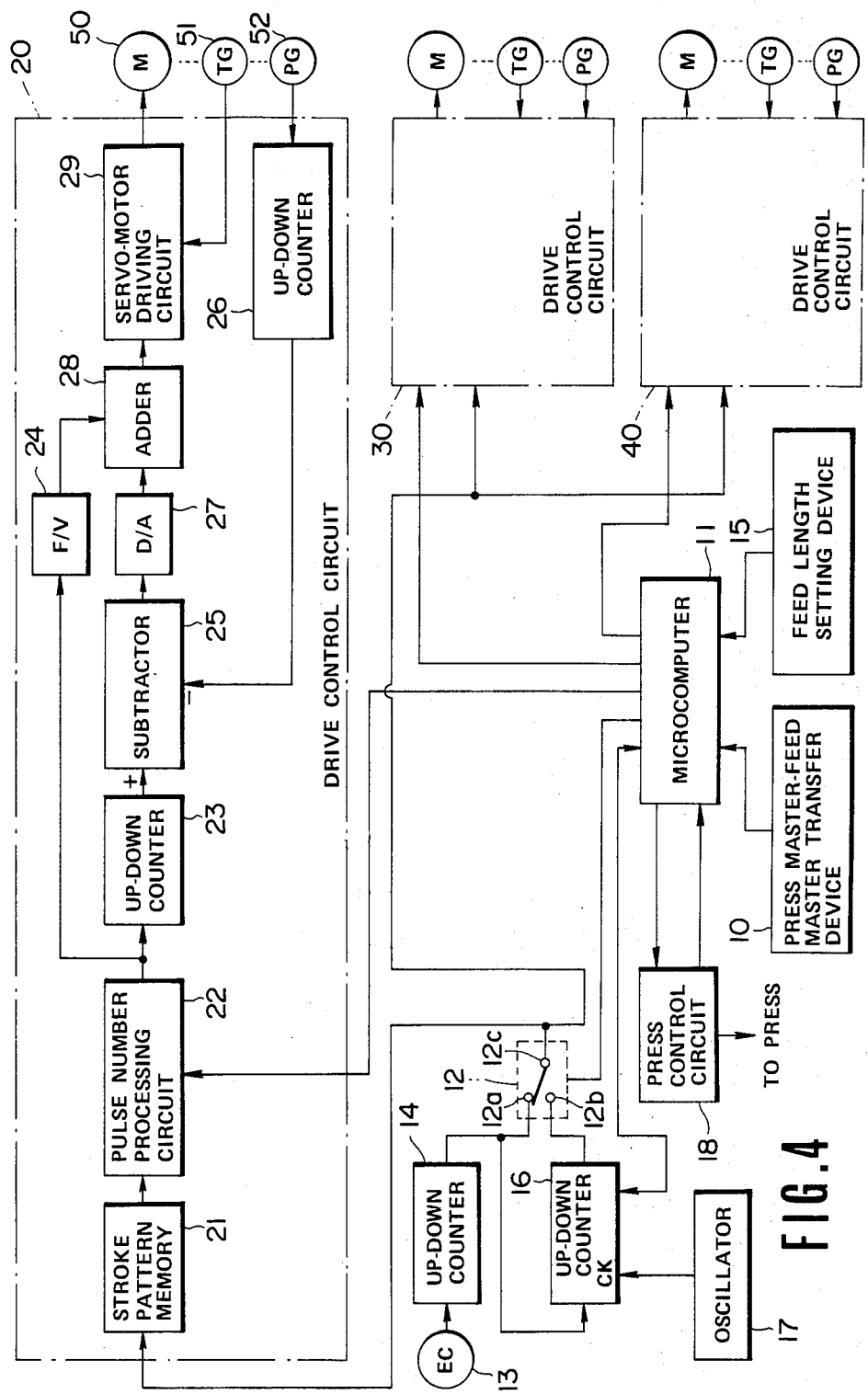
FIG. 4 is a block diagram showing a control circuit of the transfer device constituting a preferred embodiment of the present invention.

FIG. 4 illustrates an embodiment of a control circuit that controls a transfer device operable in three dimensions. In this embodiment, a press master-feed master transfer device 10 selects whether the transfer device is operated in synchronism with the press motion (motion of the crank shaft) or independently from the press motion.

A case where the press master-feed master transfer device 10 is transferred to press master and the transfer device is operated precisely in synchronism with the press movement will now be described.

When the press master-feed master transfer switch 10 is transferred to the press master operation, a microcomputer 11 provided in the control circuit delivers a signal to a transfer switch 12 to connect a movable contact 12c to a fixed contact 12a. On the other hand an encoder 13 applies a pulse signal of a number corresponding to the angular velocity for the stroke angle (crank angle) to an up-down counter 14 which counts the number of pulses of the pulse signal. The count of the up-down counter 14 corresponds to the press stroke angle. The up-down counter 14 is so arranged that each time the crank shaft of the press rotates one complete turn, the count of the counter 14 is returned to its initial value. When the press is rotated in the reverse direction, the encoder 13 generates a signal corresponding to the reverse rotation, and the up-down counter 14 down-counts the input pulse signal.

The count of the up-down counter 14 is applied to drive control circuits 20, 30 and 40 for the X axis (feed axis), Y axis (clamp axis) and Z axis (lift axis). Since the drive control operations of the circuits 30 and 40 for the Y axis and Z axis are similar to that of the circuit 20 for the X axis, only the construction and operation of the drive control circuit 20 will be described.

Figure 5:
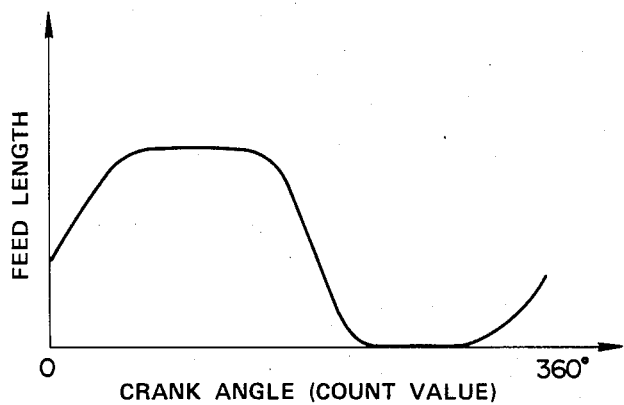
FIG. 5 is a diagram useful for explaining the operation of a stroke pattern memory provided in the control circuit shown in FIG. 4.

A stroke pattern memory 21 memorizes a velocity instruction which instructs the feed bars to move in a desired stroke pattern for a length corresponding to the crank angle (or the count of the up-down counter) along X axis as shown in FIG. 5. The instruction stored in the stroke pattern memory 21 is read out in response to the count of the up-down counter 14 applied to the memory 21 through the transfer switch 12. The velocity instruction thus read out is a pulse signal, the pulse density and polarity of which are varied depending on the velocity and the direction of movement of the feed bars. The velocity instruction is applied to a pulse number processing circuit 22. The pulse number processing circuit 22 receives as its another input a pulse reduction instruction from the microcomputer 11, which corresponds to the feed length having been set in a feed length setting device 15. The pulse number processing circuit 22 operates to "thin out" the pulse signal continuously applied thereto at a rate corresponding to the pulse reduction instruction. Accordingly, when the feed length setting device 15 sets a feed length corresponding to the maximum stroke, the pulse signal applied to the circuit 22 is not "thinned out", whereas when the setting device 15 sets a feed length equal to zero, the pulse signal delivered from the pulse number processing circuit 22 becomes zero.

The pulse signal delivered from the pulse number processing circuit 22 is applied to an up-down counter 23 and also to a frequency/voltage converter 24. The up-down counter 23 counts the input pulse signal depending on the polarity, and applies the output to a substractor 25 as an object value for the feed control. On the other hand, an encoder 52 is coupled to a servo-motor 50 that drives the feed bars in the feeding direction along X axis. The output of the encoder 52 corresponding to the rotating speed of the servo-motor 50 is applied through an up-down counter 26 to another input of the subtractor 25. The subtractor 25 thus detects the difference between the two inputs, and delivers an output signal to an adder 28 through a digital-/analog converter 27. The frequency/voltage converter 24, on the other hand, generates a voltage signal corresponding to the frequency of the input signal, and applies the voltage signal to another input of the adder 28 as a velocity instruction. The adder 28 adds two input signals to deliver an output which is applied to the servo-motor 50 through a servo-motor driving circuit 29.

The servo-motor 50 thus drives the feed bars to move along the feed axis. A velocity sensor 51 further provided with the servo-motor 50 effectuates velocity feed-back to the servo-motor driving circuit 29. The movements thus realized of the feed bars are precisely in synchronism with the press movements (or the output of the encoder 13), so that the feed bars are operated in accordance with the press operation.

Next a case where the press master-feed master transfer device 10 is transferred to feed master so as to drive the feed bars not in synchronism with the press will now be described.

Upon transferring the device 10 to feed master, the microcomputer 11 issues a signal to the transfer switch 12 thereby causing the movable contact 12c of the switch 12 to contact with another fixed contact 12b, and also issues another signal to an up-down counter 16 so that the counter 16 is preset by the count of the up-down counter 14. These two counters 14 and 16 are made into similar constructions. On the other hand, a reference pulse signal of a predetermined frequency generated from an oscillator 17 is applied to a clock input CK of the up-down counter 16. The up-down counter 16 thus starts the counting operation from the preset value, and delivers the output to the drive control circuits 20, 30 and 40 for driving the feed bars in feed, clamp and lift directions. The frequency of the reference pulse signal generated from the oscillator 17 is made adjustable suitably. The drive control circuits 20, 30 and 40 control the movements of the feed bars based on the count of the up-down counter 16. At this time the operation of the press is stopped, and the feed bars are operated independently from the operation of the press.

When the count of the up-down counter 16 varies by one complete cycle so as to be returned to the initially preset value, the microcomputer 11 inhibits further counting of the up-down counter 16, and issues a press operating instruction to a press control circuit 18 that starts and stops the press operation. The press control circuit 18, when receives the press operating instruction, starts the press operation, and after operation of one complete cycle, stops the press operation, while sending out a press operation completion signal to the microcomputer 11.

The microcomputer 11, when receives the press operation completion signal, releases the count-inhibition of the up-down counter 16, and the above described operations are repeated alternately to carry out the material feeding and pressing operations.

Although in the above described embodiment, the transfer device and the press have been operated intermittently and alternately, it is of course possible that the transfer device is operated continuously, while the starting and stopping operations of the press are carried out at appropriate timing with the material feeding operation of the transfer device. In this case, if it is so arranged that one cycle press movement from the upper dead point is effected within a time interval between the unclamp completion instant and the start-clamping instant, the press stroke can be utilized efficiently and advantageously. Furthermore, conversely from the above description, the press may be operated continuously while the transfer device is operated intermittently at appropriate timing with the press movements.

Figure 6:
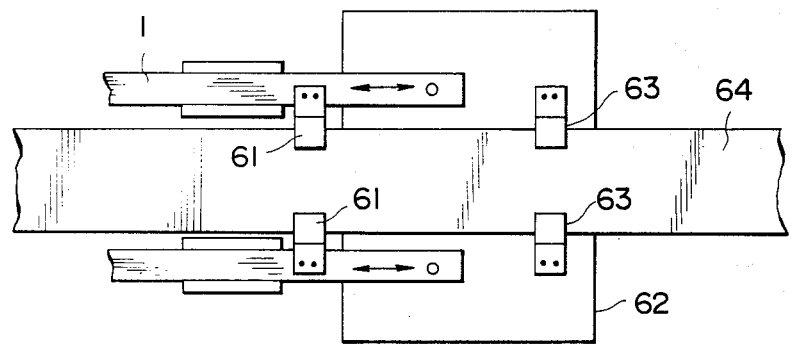
FIGS. 6 and 7 are diagrams showing important parts of the transfer device constituting further embodiments of the invention.
Figure 7:
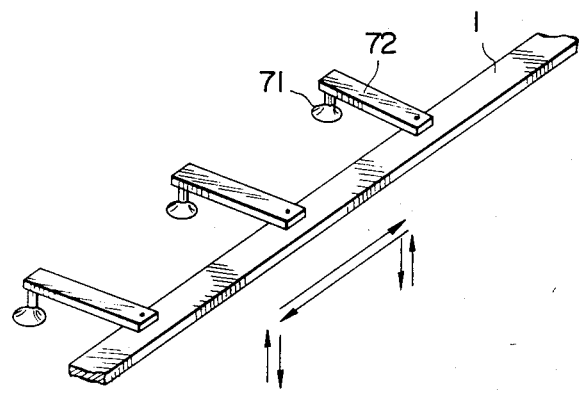

According to further application of this invention operations as shown in FIGS. 6 and 7 may also be realized. In an example shown in FIG. 6, the clamping and lifting movements of the transfer device are made inoperative, while feeding motion thereof is utilized. Furthermore, movable grippers 61 are arranged on the feed bars 1, while fixed grippers 63 are arranged on a feed box 62. By alternately activating the movable grippers 61 and the fixed grippers 63, a coiled material 64 may be shifted as desired. The clamping and lifting motions of the transfer device may be held inoperative by setting the clamp and lift setting devices (not shown) at zero. In this manner no output pulse signals are delivered from the pulse number processing circuits in the drive control circuits 30 and 40.

Where vacuum cups are utilized in preference to the clamping for transferring products out of a press, one of the two feed bars may be removed, while arms 72 each provided with a vacuum cup 71 may be secured to the remaining feed bar as shown in FIG. 7. With this construction, the products may be transferred out of the press during a robot-like motion of the feed bar shown in FIG. 7. If it is desired, a plurality of magnets may also be provided on the arms instead of the above described vacuum cups. Although the invention has been described with respect to a transfer device of three dimensional type, it is apparent that two-dimensional transfer device may also be used with similar advantageous features.

What is claimed is:

1. A control circuit for coordination of the operation of a transfer device and a press, said press having a variable press stroke angle, comprising:
    first signal generating means for generating a first signal indicative of said press stroke angle;
    second signal generating means for generating a second signal indicative of the operational position of said transfer device;
    a drive control circuit for driving said transfer device;
    switching means for alternatively directing one of said signals to said drive control circuit;
    selectable press control means for providing an inhibition signal to said press when said second signal is directed to said drive control circuit; and
    selectable transfer device control means for providing an inhibition signal to said transfer device when said second signal is directed to said drive control circuit.

2. A control circuit as set forth in claim 1, wherein said first signal generating means comprises a pulse generating encoder and a counter for counting said pulses generated by said encoder.

3. A control circuit as set forth in claim 1, wherein said second signal generating means comprises a pulse generating oscillator and a second counter for counting said pulses generated by said oscillator.

4. A control circuit as set forth in claim 3, wherein said second counter may be preset to the identical count value of said first counter.

5. A control circuit as set forth in claim 1, wherein said transfere device includes at least two feed bars movable in at least two axial directions.

6. A control circuit as set forth in claim 5, further comprising:
    means for setting a transfer length along each axial direction of said feed bar.

7. A control circuit for a transfer device of a press, said press having a variable press stroke angle, comprising:
    synchronization control means for controlling the movement of said transfer device based upon said variable press stroke angle;
    alternate control means for controlling the movement of said transfer device independent of said press movement, said alternate control means including selectable transfer device inhibition menas for inhibiting movement of said transfer device; and
    swithch means for alternately engaging one of said control means with said transfer device.

8. A control device according to claim 7, wherein said alternated control means further includes selectable press inhibition means for inhibiting movement of said press.

9. A control circuit according to claim 8, wherein said transfer device inhibition means and said press inhibition means are alternatively operable.

10. A control circuit according to claim 7, wherein said synchronization means includes an encoder for detecting said variable press stroke angle.

11. A control device for use in a transfer press of a type including a mechanical press, a pair of feed bars movable in 2- or 3- axis directions and a drive control system for controlling a drive of respective axes of said feed bars according to signals indicative of the movement of each axis for one stroke by means of a servo actuator, comprising
    first signal generating means for generating a first signal indicative of the movement of each axis for one stroke based on a press stroke angle of said mechanical press;
    second signal generating means for generating a second signal indicative of the movement of each axis for one stroke having an arbitrary period;
    switching means for selecting and supplying to said drive control system either one of signals generated from said first and second signal generating means; and
    press control means for providing start and stop command signals to said mechanical press based on said second signal when said switching means selects the second signal so that said mechanical press performs press operation for one stroke during a period when no interference takes place with said feed bars.

12. The control device as set forth in claim 11, wherein said first signal generating means comprises an encoder for generating a pulse signal whose pulse number corresponds to the rotation of a crank shaft of said mechancial press, a first counter for counting said pulse signal, and a stroke pattern memory for reading out said first signal using the count value of said first counter as an address signal.

13. The control device as set forth in claim 11, wherein said second signal generating means comprises an oscillator for generating a reference pulse signal, a second counter for counting said reference pulse signal, and a stroke pattern memory for reading out said second signal using the count value of said second counter as an address signal.

14. The control device as set forth in claim 13, wherein said second counter is caused to be preset to count value of said first counter outputting the count value representative of a stroke angle of said mechanical press.

15. The control device as set forth in claim 11 further comprising means for setting feed length for each axis of said feed bar and means for changing signals outputted from said first and second signal generating means based on the feed length set by said feed length setting means.

* * * * *